(12) United States Patent
Cardoso, Jr.

(10) Patent No.: US 6,247,071 B1
(45) Date of Patent: Jun. 12, 2001

(54) SYSTEM FOR RECEIVING AN ISOCHRONOUS DATA STREAM AT A COMPUTER USING A MAIN MEMORY BUFFER

(75) Inventor: Augusto C. Cardoso, Jr., Oakland, CA (US)

(73) Assignee: B2C2, Inc., Alameda, CA (US)

( * ) Notice: Subject to any disclaimer, the term of this patent is extended or adjusted under 35 U.S.C. 154(b) by 0 days.

(21) Appl. No.: 09/432,816

(22) Filed: Nov. 2, 1999

Related U.S. Application Data

(60) Provisional application No. 60/157,558, filed on Oct. 4, 1999.

(51) Int. Cl.[7] .................................................. G06F 13/00
(52) U.S. Cl. ............................. 710/52; 709/250; 709/302
(58) Field of Search .............................. 455/3.2; 709/212, 709/231, 236, 250, 301, 302; 710/22, 29–30, 48, 52, 60–61, 69; 725/135

(56) References Cited

U.S. PATENT DOCUMENTS

| | | | |
|---|---|---|---|
| 5,862,343 | * | 1/1999 | Landguth et al. .................. 709/236 |
| 5,944,801 | * | 8/1999 | Gulick ................................... 710/29 |
| 5,958,027 | * | 9/1999 | Gulick ................................... 710/52 |
| 5,991,520 | * | 11/1999 | Smyers et al. ...................... 710/112 |
| 5,996,031 | * | 11/1999 | Lim et al. ............................. 710/52 |
| 6,101,368 | * | 8/2000 | Farnsworth et al. ................ 725/135 |
| 6,119,243 | * | 9/2000 | Garney et al. ...................... 713/600 |

* cited by examiner

*Primary Examiner*—Christopher B. Shin
(74) *Attorney, Agent, or Firm*—Park, Vaughan & Fleming LLP

(57) ABSTRACT

One embodiment of the present invention provides a system for receiving an isochronous stream of data that buffers the isochronous stream of data within a main memory in a computer system. The system operates by receiving the isochronous stream of data within an interface within the computer system. The system demodulates this isochronous stream of data to translate the isochronous stream of data from a modulated analog form into a digital form. Next, the system forwards the isochronous stream of data from the interface into a buffer within the main memory of the computer system without interrupting the processor. Next, the data passes from the buffer through a driver that communicates with an application program on the computer system.

27 Claims, 4 Drawing Sheets

SYSTEM FOR RECEIVING AN ISOCHRONOUS DATA STREAM AT A COMPUTER USING A MAIN MEMORY BUFFER

RELATED APPLICATION

The application hereby claims priority under 35 U.S.C. § 119 to Provisional Patent Application No. 60/157,558 filed on Oct. 4, 1999.

BACKGROUND

1. Field of the Invention

The present invention relates to computer systems and data transmissions. More specifically, the present invention relates to a method and an apparatus for receiving an isochronous stream of data at a computer system that transfers the isochronous stream of data into a buffer within the main memory of the computer system without interrupting the processor.

2. Related Art

Recent advances in computer networking technologies have increased the speed with which data that can be supplied to a computer system over a computer network. This additional speed makes it possible to provide new services, such as streaming video and rapid Internet access to a computer system user. Unfortunately, the computer system performance that is required to provide such services can surpass the performance limitations of existing computer system designs.

One particular problem is encountered in receiving an "isochronous" stream of data from a remote transmitter, such as a satellite. Unlike other types of data transmissions across a computer network, an isochronous stream of data continues to pour in at a fixed rate regardless of whether the computer system is able to accommodate the additional data or not.

This can present significant challenges in designing a computer system to handle an isochronous stream of data. The isochronous data must somehow be buffered so that the data does not become lost before an application can view the data. However, the buffer has to be quite large to accommodate enough data to allow the application enough time to process the data. Consequently, providing enough memory to buffer the isochronous data inside of an interface card can significantly increase the cost of the interface card.

Furthermore, in a conventional computer system, transferring the isochronous stream of data from the interface card to an application in the computer system causes a processor interrupt to transfer each packet of data. This can greatly impede computer system performance because each interrupt consumes a large number of processor cycles, and large number of interrupts are required to transfer the isochronous stream of data one packet at a time.

What is needed is a computer system that is able to buffer an isochronous stream of data without incurring the cost involved in providing a significant amount of memory inside of an interface card to buffer the data.

Additionally, what is needed is a computer system that is able to transfer an isochronous stream of data to an application within the computer system without causing a large number of processor interrupts.

SUMMARY

One embodiment of the present invention provides a system for receiving an isochronous stream of data that buffers the isochronous stream of data within a main memory in a computer system. The system operates by receiving the isochronous stream of data within an interface within the computer system. The system demodulates this isochronous stream of data to translate the isochronous stream of data from a modulated analog form into a digital form. Next, the system forwards the isochronous stream of data from the interface into a buffer within the main memory of the computer system without interrupting the processor. Next, the data passes from the buffer through a driver that communicates with an application program on the computer system.

In one embodiment of the present invention, the buffer within the main memory resides within a system space in an operating system of the computer system.

In one embodiment of the present invention, the isochronous stream of data is received from a satellite.

In one embodiment of the present invention, passing the data from the buffer through the driver involves trapping to the driver on a periodic timer interrupt. The driver parses the data to determine what type of data is being received, and sends the data to the application program.

In one embodiment of the present invention, forwarding the isochronous stream of data from the interface is accomplished using direct memory access (DMA).

In one embodiment of the present invention, forwarding the isochronous stream of data from the interface into the buffer involves waiting until a local buffer within the interface is full. When the local buffer is full, the system requests control over a bus at the interface. When a grant of bus master status is received, the system transfers data from the local buffer across the bus into the buffer within the main memory.

In one embodiment of the present invention, the act of receiving the isochronous stream of data involves receiving the isochronous stream of data into the local buffer while data is being transferred from a second local buffer into the buffer within the main memory. It also involves receiving the isochronous stream of data into in the second local buffer while data is being transferred from the local buffer to the buffer within the main memory.

In one embodiment of the present invention, the buffer within the main memory is organized as a first-in-first-out (FIFO) buffer.

One embodiment of the present invention allocates the buffer within the main memory during a computer system initialization operation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
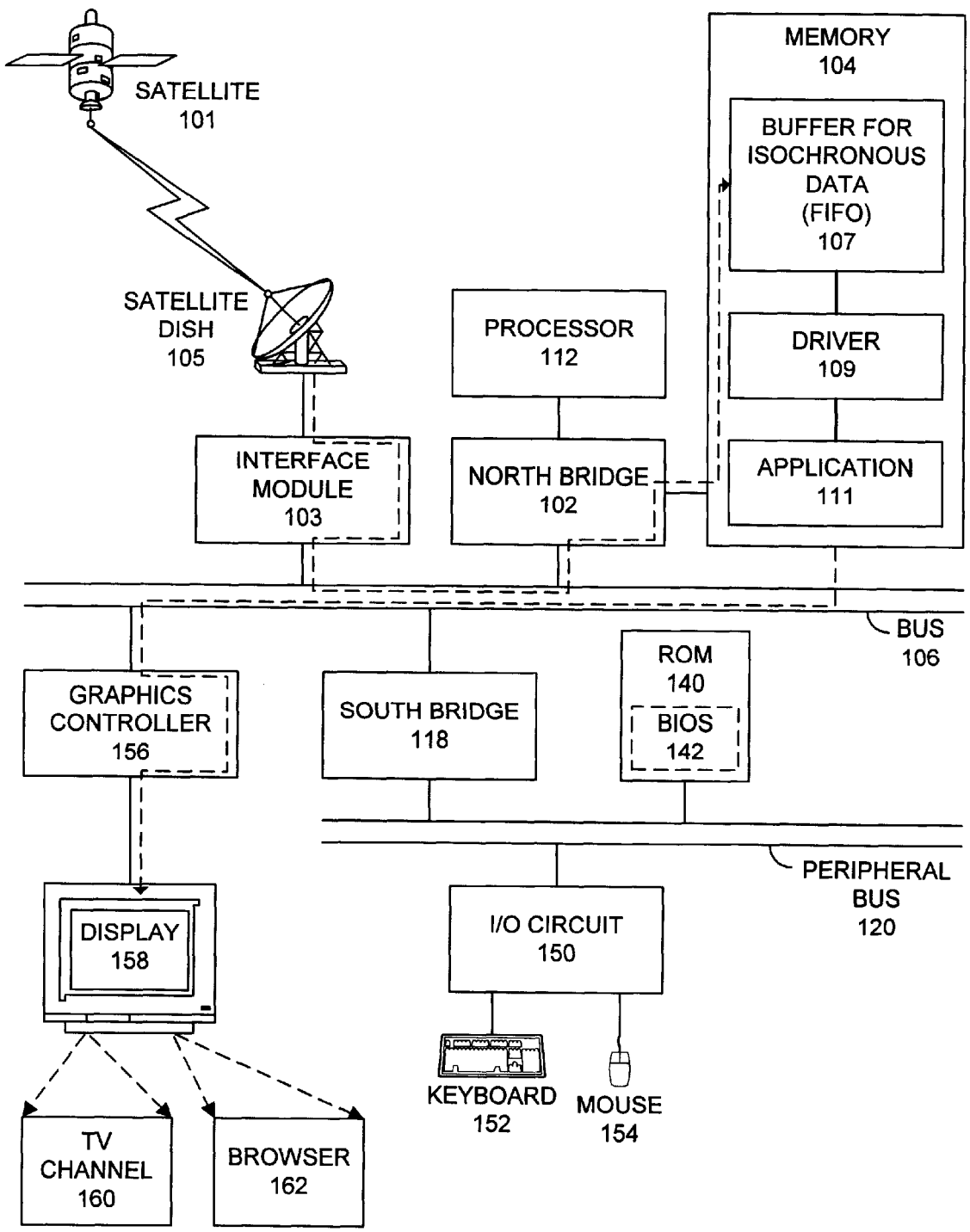
FIG. 1 illustrates a computer system that receives an isochronous stream of data from a satellite in accordance with an embodiment of the present invention.

FIG. 1 illustrates a computer system that receives an isochronous stream of data from a satellite 101 in accordance with an embodiment of the present invention. Satellite 101 can include any type of broadcast satellite or communication satellite that is capable of sending a transport stream, such as a digital Motion Picture Experts Group (MPEG) 2 transport stream. A signal from satellite 101 is received at satellite dish 105, which is coupled with interface module 103. Interface module 103 converts the signal from satellite 101 into a digital form that can be manipulated by the computer system.

The computer system illustrated in FIG. 1 includes processor 112 which is coupled to north bridge 102. Processor 112 can include any type of general or special purpose processor, including, but not limited to, a microprocessor, a mainframe computer, a digital signal processor, a graphics processor or a device controller.

North bridge 102 couples processor 112 with memory 104 and bus 106. Memory 104 is the "main memory" of the computer system and is used to store code and/or data for the computer system. Memory 104 can include any type of volatile or nonvolatile random access memory. Memory 104 contains a number of items, including buffer 107, driver 109 and application 111. Buffer 107 is a buffer in memory 104 that is used to buffer data in transit between interface module 103 and application 111. Note that buffer 107 can be organized as a FIFO. Driver 109 is a mechanism through which application 111 accesses an isochronous stream of data from satellite 101. Application 111 can include any type of application that references an isochronous stream of data. This can include an application that provides streaming video from a TV channel, an application that provides audio signals, or an application that provides fast web browsing.

Bus 106 couples north bridge 102 to south bridge 118. Bus 106 can include any type of communication channel for coupling north bridge 102 to other devices in the computer system, including peripheral devices and memory devices. In one embodiment of the present invention, bus 106 is a PCI bus.

South bridge 118 includes circuitry for coupling together components of the computer system. More, particularly, south bridge 118 couples bus 106 to peripheral bus 120.

Peripheral bus 120 can include any type of communication channel for coupling south bridge 118 to other devices in a computer system, including peripheral devices and memory devices. In one embodiment of the present invention, peripheral bus 120 includes an ISA bus. Peripheral bus 120 is coupled to ROM 140, which contains BIOS 142. Peripheral bus 120 is additionally coupled I/O circuit 150. I/O circuit 150 is itself coupled to keyboard 152 and mouse 154.

Bus 106 is also coupled to graphics controller 156. Graphics controller 156 can include any type of processing circuitry and/or memory for processing graphical images in the computer system. Graphics controller 156 is coupled to display 158, which displays graphical images. Display 158 can be used to display a live video feed in the form of a TV channel 160. Display 158 can also be used to display images for a web browser 162 to access web sites on the Internet.

The system illustrated in FIG. 1 operates generally as follows. An isochronous stream of data continually pours in from satellite 101 into satellite dish 105. This stream of data passes through interface module 103, across bus 106 and north bridge 102, and into buffer 107 in memory 104. From buffer 107, the data passes through driver 109 into application 111. Application 111 can do a number of things with the data. If the data consists of graphical or video images, application 111 sends the data across bus 106, through graphics controller 156, and into display 158 for viewing by a user of the computer system.

Interface Module

Figure 2:
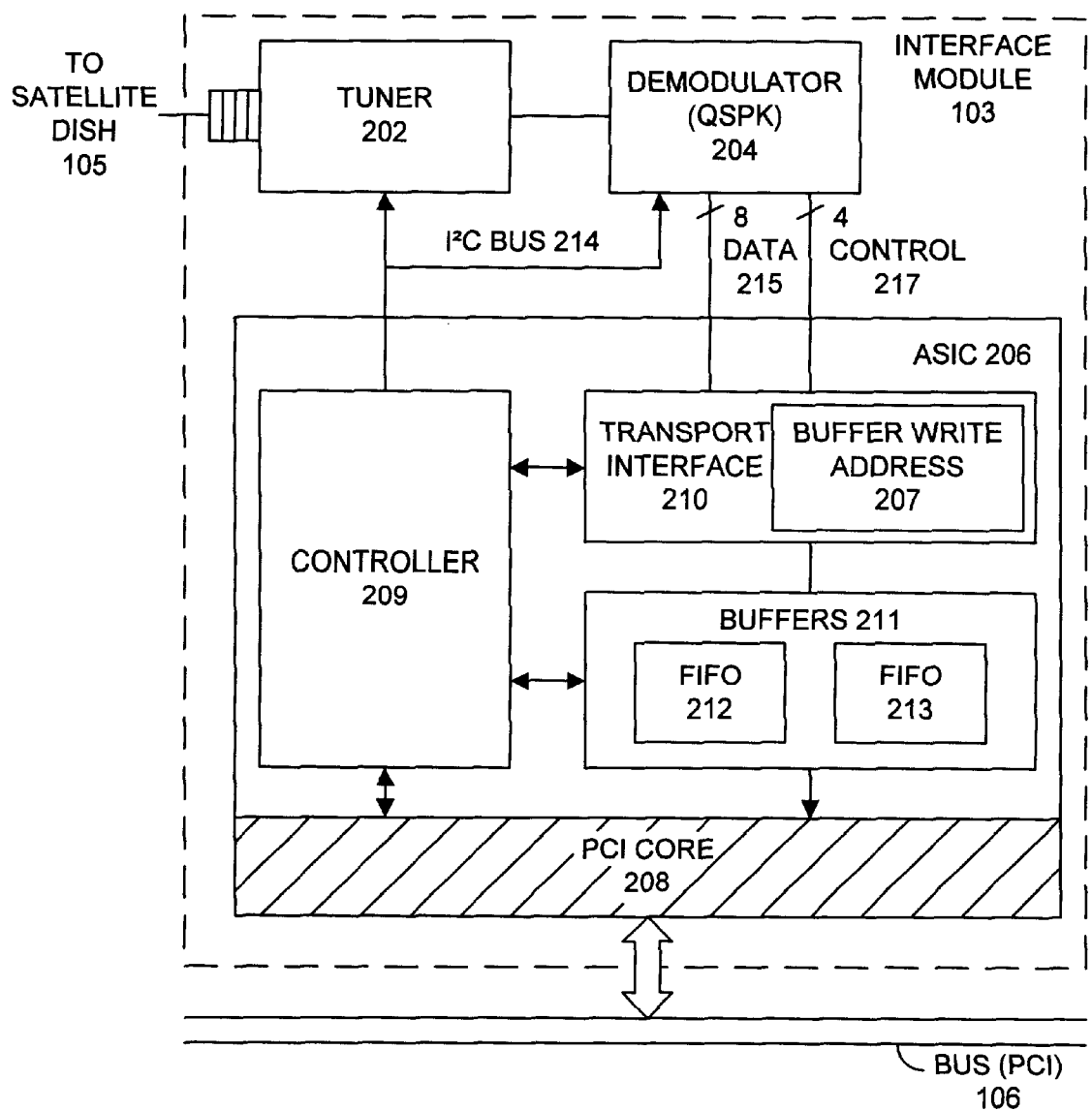
FIG. 2 illustrates the internal structure of an interface module that receives satellite data in accordance with an embodiment of the present invention.

FIG. 2 illustrates the internal structure of interface module 103 in accordance with an embodiment of the present invention. Interface module 103 includes tuner 202, demodulator 204 and application specific integrated circuit (ASIC) 206. Tuner 202 can include any type of circuit that can be tuned to receive signals from a satellite. Demodulator 204 can include any type of circuit that can demodulate signals received from a satellite through tuner 202. Demodulator 204 converts the signal from the satellite into a digital form, which is transferred across data lines 215 and control lines 217 into ASIC 206.

ASIC 206 includes circuitry that interfaces with PCI bus 106 and demodulator 204, as well as circuitry that controls the operation of interface module 103. More specifically, ASIC 206 includes PCI core 208, buffers 211, transport interface 210 and tuner 202. PCI core 208 includes standard circuitry to interface with PCI bus 106.

Buffers 211 include small buffers that are used to store data in transit between interface module 103 and buffer 107 in memory 104. In the illustrated embodiment, buffers 211 include FIFOs 212 and 213 that operate in a "ping pong" fashion. When FIFO 212 is being filled from the isochronous stream of data, the contents of FIFO 213 is being transferred across PCI bus 106 into buffer 107 in memory 104. When FIFO 213 is being filled from the isochronous stream of data, the contents of FIFO 212 is being transferred across PCI bus 106 into buffer 107. FIFOs 212 and 213 alternate in this way as the isochronous stream of data is being received. In one embodiment of the present invention, FIFOs 212 and 213 include only enough memory to store a single packet of data from the isochronous data stream. In another embodiment, FIFOs 212 and 213 contain only enough memory to store an amount of data that can be transferred across bus 106 in a single block transfer operation. By keeping these FIFOs 212 and 213 at this minimal size, the cost of interface module 203 can be greatly reduced. Hence, the present invention uses buffer 107 in memory 104 to store the isochronous stream of data for application 111 instead of a large buffer within interface module 103.

Transport interface 210 includes circuitry for receiving a transport packet signal (such as a Motion Picture Experts Group (MPEG) 2 packet) on data lines 215 and control lines 217. Transport interface 210 also includes buffer write address 207, which keeps track of the address within buffers 211 into which the isochronous stream of data is being written.

Controller 209 includes a number of finite state machines that control the operation of interface module 103. These finite state machines are described in more detail below. Controller 209 is directly connected within transport interface 210, buffers 211 and PCI core 208 within ASIC 206. Controller 209 is also coupled with tuner 202 and demodulator 204 through I²C bus 214.

Controller for Interface Module

Figure 3:
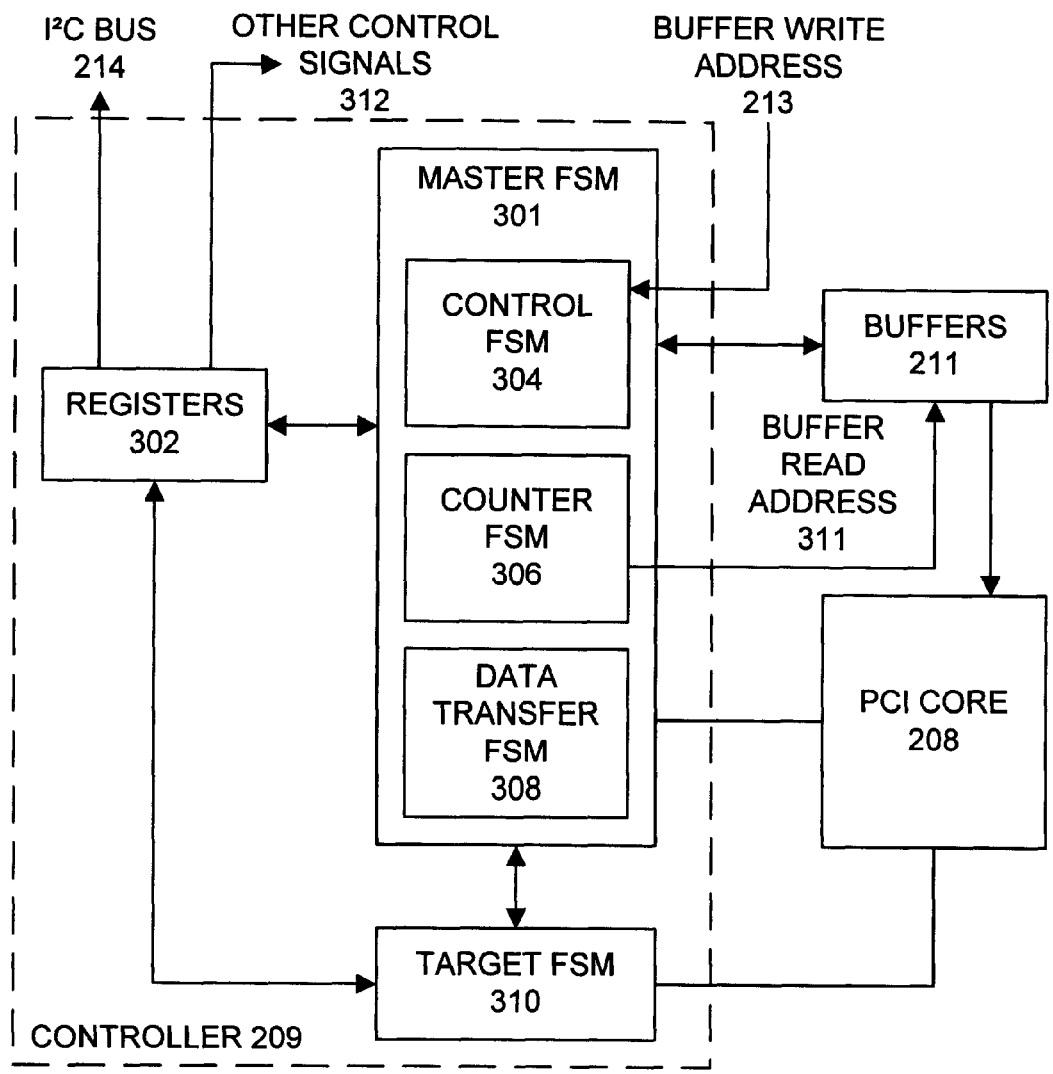
FIG. 3 illustrates the internal structure of a controller for the interface module in accordance with an embodiment of the present invention.

FIG. 3 illustrates the internal structure of a controller 209 within interface module 103 in accordance with an embodiment of the present invention. Controller 209 includes master finite state machine (FSM) 301, target FSM 310 and registers 302. Registers 302 generally include control an status registers for controller 209. Control signals originate from registers 302 and propagate through I²C bus 214 to tuner 202 and to demodulator 204. Other control signals 312 also originate from registers 302. These other control signals 312 control other components within interface module 103.

Target FSM 310 generally allows interface module 103 to act as a PCI target within interface module 103. This allows interface module 103 to receive data from PCI bus 106 as the target of a bus master on PCI bus 106.

Master FSM 301 generally allows interface module 103 to act as a PCI master within interface module 103. Master FSM 301 requests master status on bus 106 and coordinates data transfers from interface module 103 across bus 106. To this end, master FSM 301 includes a number of finite state machines, including control FSM 304, counter FSM 306 and data transfer FSM 308. Control FSM 304 receives buffer write address 207 from transport interface 210. When FIFO 212 or FIFO 213 becomes full, control FSM 306 initiates a transfer of the contents of FIFO 212 or FIFO 213 into buffer 107 within memory 104. Counter FSM 306 generates a buffer read address 311, which points to an address in buffers 211 from which data is being read in order to be transferred to buffer 107 in memory 104. Data transfer FSM 308 communicates with PCI core 208 and coordinates data transfer operations across PCI bus 106.

Process of Receiving Isochronous Data

Figure 4:
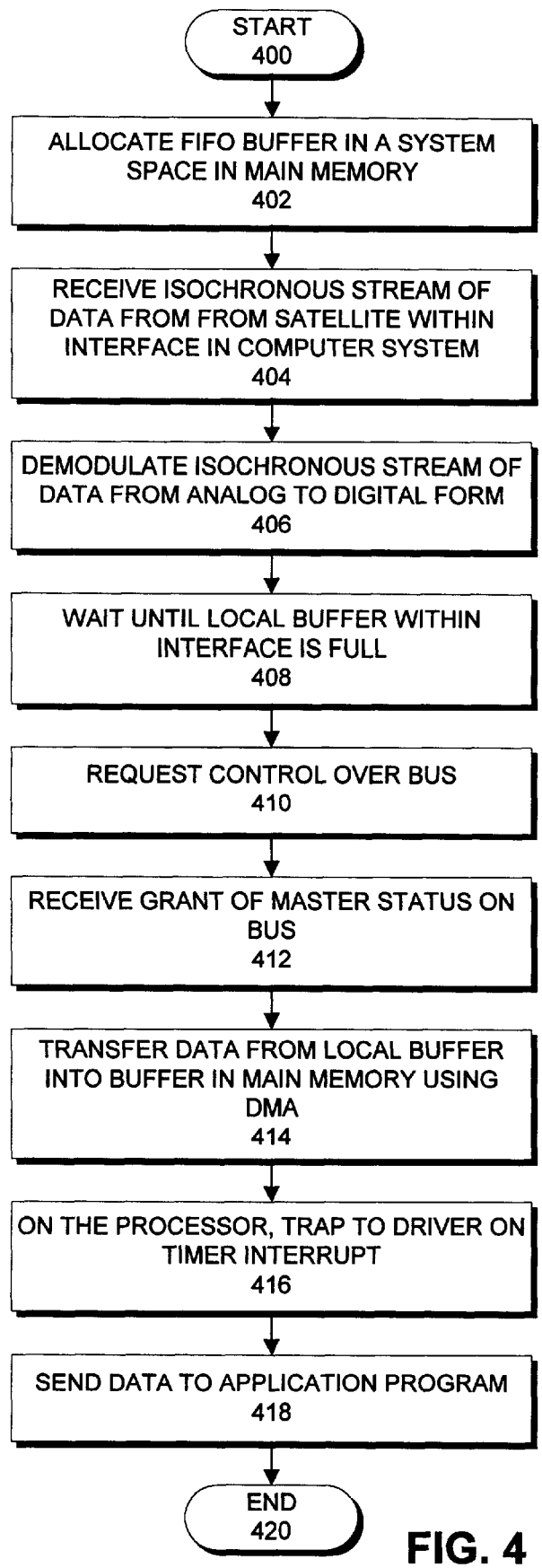
FIG. 4 is a flow chart illustrating the process of receiving an isochronous stream of data in accordance with an embodiment of the present invention.

FIG. 4 is a flow chart illustrating the process of receiving an isochronous stream of data in accordance with an embodiment of the present invention. The system starts by allocating a buffer within the main memory of a computer system (step 402). In FIG. 1, this corresponds to allocating buffer 107 within memory 104. In one embodiment of the present invention, buffer 107 is allocated in the system space of an operating system running on the computer system. In one embodiment, buffer 107 is allocated by boot code within BIOS 142 within ROM 140 during a system boot process.

Next, the system receives a signal containing an isochronous stream of data from satellite 101 within interface module 103 (step 404). This signal is received at tuner 202 within interface module 103. The system next demodulates the signal by passing it through demodulator 204 (step 406), and passes the signal into FIFOs 212 and 213.

The system waits until one of FIFOs 212 and 213 becomes full (step 408). When a buffer becomes full, master FSM 301 requests control over bus 106 (step 410). When bus 106 eventually becomes free, interface module 103 receives a grant of master status on bus 106 (step 412).

Next, interface module 103 transfers data from either FIFO 212 or FIFO 213 into buffer 107 in memory 104 using direct memory access (DMA) (step 414). Recall that a DMA transfer is accomplished without having to pass the transferred data through processor 112.

Once the data is stored within buffer 107 in memory 104, processor 112 takes over. On a periodic system timer interrupt, processor 112 traps to driver 109. Driver 109 sends the data from buffer 107 to application 111. In one embodiment of the present invention, driver 109 actually sends the data to a second driver (not shown), and this second driver actually communicates with application 111. In one embodiment of the present invention, driver 109 parses the data to determine what type of data is being received. If the data includes a null packet, the null packet is not sent to application 111.

Note that although the present invention is described in terms of a system that receives satellite transmissions, the present invention can generally be applied to any type of system that receives an isochronous stream of data, and is not limited to systems that receive data from a satellite.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of invention is defined by the appended claims.

What is claimed is:

1. A computer system that is configured to receive an isochronous stream of data, comprising:

a processor;

a main memory;

a buffer within the main memory that is organized as a first-in-first-out (FIFO) buffer for storing data from the isochronous stream of data;

a mechanism that allocates the buffer within the main memory during a computer system initialization operation;

a bus coupled to the processor;

an interface module within the computer system that receives the isochronous stream of data from a satellite;

a demodulator within the interface module that demodulates the isochronous stream of data to translate the isochronous stream of data from a modulated analog form into a digital form;

a local buffer within the interface module and coupled to the demodulator for storing a unit of data from the isochronous stream of data;

a second local buffer within the interface module and coupled to the demodulator for storing a unit of data from the isochronous stream of data;

wherein the second local buffer is loaded from the isochronous stream of data while data from the local buffer is being transferred across the bus;

wherein the local buffer is loaded from the isochronous stream of data while data from the second local buffer is being transferred across the bus;

a bus interface within the interface module that is configured to facilitate communications across the bus; and a controller within the interface module that is configured to perform a DMA operation to move a unit of data from the local buffer across the bus to the buffer within the main memory;

wherein the controller is configured to,
    wait until the local buffer is full, request control over the bus,
receive a grant of master status over the bus, and
transfer data across the bus from the local buffer into the buffer within the main memory.

2. A computer system that is configured to receive an isochronous stream of data, comprising:
a processor;
a main memory;
a bus coupled to the processor;
an interface module within the computer system that receives the isochronous stream of data;
a demodulator that demodulates the isochronous stream of data to translate the isochronous stream of data from a modulated analog form into a digital form;
a local buffer coupled to the demodulator for storing a unit of data from the isochronous stream of data;
a bus interface within the interface module that is configured to facilitate communications across the bus; and
a controller within the interface module that is configured to perform a DMA operation to move a unit of data from the local buffer across the bus to a buffer within the main memory without interrupting the processor.

3. The computer system of claim 2, wherein the controller is configured to perform the DMA operation by,
waiting until the local buffer is full;
requesting control over the bus;
receiving a grant of master status over the bus; and
transferring data across the bus from the local buffer into the buffer within the main memory.

4. The computer system of claim 2, wherein the isochronous stream of data is received from a satellite.

5. The computer system of claim 2, wherein the processor is configured to:
trap to a driver on a periodic timer interrupt;
parse data from the buffer to determine what type of data is being received; and send the data to an application program.

6. The computer system of claim 2, further comprising a second local buffer within the interface module and coupled to the demodulator for storing a unit of data from the isochronous stream of data;
wherein the second local buffer is loaded from the isochronous stream of data while data from the local buffer is being transferred across the bus; and
wherein the local buffer is loaded from the isochronous stream of data while data from the second local buffer is being transferred across the bus.

7. The computer system of claim 2, wherein the buffer within the main memory is organized as a first-in-first-out (FIFO) buffer.

8. The computer system of claim 2, further comprising a mechanism that allocates the buffer within the main memory luring a computer system initialization operation.

9. The computer system of claim 2, wherein the buffer within the main memory resides within a system space in an operating system within the main memory of the computer system.

10. An apparatus within a computer system that is configured to receive an isochronous stream of data and to forward the isochronous stream of data to a buffer in a main memory within the computer system, comprising:
an interface module within the computer system that receives the isochronous stream of data;
a demodulator within the interface module that demodulates the isochronous stream of data to translate the isochronous stream of data from a modulated analog form into a digital form;
a local buffer within the interface module and coupled to the demodulator for storing a unit of data from the isochronous stream of data;
a bus interface within the interface module that is configured to facilitate communications across a bus in the computer system; and
a controller within the interface module that is configured to perform a DMA operation to move a unit of data from the local buffer across the bus to the buffer within the main memory within the computer system without interrupting a processor in the computer system.

11. The apparatus of claim 10, wherein the controller is configured to perform the DMA operation by,
waiting until the local buffer is full;
requesting control over the bus;
receiving a grant of master status over the bus; and
transferring data across the bus from the local buffer into the buffer within the main memory.

12. The apparatus of claim 10, wherein the unit of data is an amount of data that can be transferred across the bus in a single block transfer operation.

13. The apparatus of claim 10, further comprising a second local buffer within the interface module and coupled to the demodulator for storing a unit of data from the isochronous stream of data,
wherein the second local buffer is loaded from the isochronous stream of data while data from the local buffer is being transferred across the bus; and
wherein the local buffer is loaded from the isochronous stream of data while data from the second local buffer is being transferred across the bus.

14. The apparatus of claim 10, wherein the isochronous stream of data is received from a satellite.

15. The apparatus of claim 10, wherein the buffer within the main memory resides within a system space of an operating system within the main memory of the computer system.

16. A method for receiving an isochronous transmission that buffers the isochronous transmission within a main memory of a computer system, comprising:
allocating a buffer within the main memory during a computer system initialization operation;
wherein the buffer is organized as a first-in-first-out (FIFO) buffer;
receiving an isochronous stream of data within an interface within the computer system;
wherein the isochronous stream of data is received from a satellite;
demodulating the isochronous stream of data within the interface to translate the isochronous stream of data from a modulated analog form to a digital form;
forwarding the isochronous stream of data from the interface into the buffer within the main memory of the computer system without interrupting a processor in the computer system by,
waiting until a local buffer within the interface is full,
requesting control over a bus at the interface,
receiving a grant of master status over the bus at the interface, and
transferring data from the local buffer across the bus into the buffer within the main memory using direct memory access (DMA); and passing data from the buffer through a driver that communicates with an application program on the computer system by, trapping to the driver on a periodic timer interrupt, and sending the data to the application program.

17. The method of claim 16, wherein receiving the isochronous stream of data includes one of:

receiving the isochronous stream of data into in the local buffer while data is being transferred from a second local buffer to the buffer within the main memory; and receiving the isochronous stream of data into in the second local buffer while data is being transferred from the local buffer to the buffer within the main memory.

18. The method of claim 16, wherein the buffer within the main memory resides within a system space of an operating system within the computer system.

19. A method for receiving an isochronous stream of data that buffers the isochronous stream of data within a main memory of a computer system, comprising:

receiving the isochronous stream of data within an interface within the computer system;

demodulating the isochronous stream of data within the interface to translate the isochronous stream of data from a modulated analog form into a digital form;

forwarding the isochronous stream of data from the interface into a buffer within the main memory of the computer system without interrupting a processor in the computer system; and passing data from the buffer through a driver that communicates with an application program on the computer system.

20. The method of claim 19, wherein the buffer resides within a system space of an operating system within the computer system.

21. The method of claim 19, wherein the isochronous stream of data is received from a satellite.

22. The method of claim 19, wherein passing the data from the buffer through the driver further comprises:

trapping to the driver on a periodic timer interrupt;

parsing the data to determine what type of data is being received; and sending the data to the application program.

23. The method of claim 19, wherein forwarding the isochronous stream of data from the interface into the buffer includes transferring the isochronous stream of data over a bus using direct memory access (DMA).

24. The method of claim 23, wherein forwarding the isochronous stream of data from the interface into the buffer further comprises, waiting until a local buffer within the interface is full;

requesting control over a bus at the interface;

receiving a grant of master status over the bus at the interface; and transferring data from the local buffer across the bus into the buffer within the main memory.

25. The method of claim 19, wherein receiving the isochronous stream of data includes one of:

receiving the isochronous stream of data into in the local buffer while data is being transferred from a second local buffer to the buffer within the main memory; and receiving the isochronous stream of data into in the second local buffer while data is being transferred from the local buffer to the buffer within the main memory.

26. The method of claim 19, wherein the buffer within the main memory is organized as a first-in-first-out (FIFO) buffer.

27. The method of claim 19, further comprising allocating the buffer within the main memory during a computer system initialization operation.

* * * * *